(12) United States Patent
Iso (10) Patent No.: US 12,518,955 B2
(45) Date of Patent: Jan. 6, 2026

(54) IONIZATION DEVICE AND IONIZATION METHOD

(71) Applicant: SHIMADZU CORPORATION, Kyoto (JP)

(72) Inventor: Keisuke Iso, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 578 days.

(21) Appl. No.: 17/960,447

(22) Filed: Oct. 5, 2022

(65) Prior Publication Data

US 2023/0420239 A1  Dec. 28, 2023

(30) Foreign Application Priority Data

Jun. 23, 2022  (JP) ................................. 2022-100956

(51) Int. Cl.
*H01J 49/16* (2006.01)
*G01N 30/72* (2006.01)
*H01J 49/04* (2006.01)

(52) U.S. Cl.
CPC ........ *H01J 49/165* (2013.01); *G01N 30/7246* (2013.01); *H01J 49/044* (2013.01); *H01J 49/0477* (2013.01)

(58) Field of Classification Search
CPC ... H01J 49/165; H01J 49/044; G01N 30/7246
See application file for complete search history.

(56) References Cited

U.S. PATENT DOCUMENTS

| 5,359,196 | A | * | 10/1994 | Whitt | .................. | H01J 49/0422 |
|---|---|---|---|---|---|---|
| | | | | | | 250/281 |
| 5,412,208 | A | * | 5/1995 | Covey | ................ | G01N 30/7246 |
| | | | | | | 250/281 |
| 6,759,650 | B2 | | 7/2004 | Covey et al. | | |

* cited by examiner

*Primary Examiner* — Robert H Kim
(74) *Attorney, Agent, or Firm* — Sughrue Mion, PLLC (57) ABSTRACT

In an ionization device for an ionization chamber (11) separated from an analysis chamber (12-14) by a partition wall having an ion introduction port (113), an ionization probe (111) sprays a liquid sample. A heated-gas supply mechanism (112), which includes a gas supply source and a heating section (1122) for heating a gas supplied from the gas supply source, expels the gas in a direction intersecting with the direction in which the liquid sample is sprayed from the ionization probe. A controller (32) controls an operation of the heated-gas supply mechanism so that the gas is continuously expelled from the heated-gas supply mechanism regardless of the presence or absence of an operation by a user while the liquid sample is sprayed from the ionization probe. The continuous expulsion of the gas from the heated-gas supply mechanism prevents this mechanism from being contaminated by the sprayed liquid.

7 Claims, 3 Drawing Sheets

IONIZATION DEVICE AND IONIZATION METHOD

TECHNICAL FIELD

The present invention relates to a technique for ionizing a liquid sample.

BACKGROUND ART

Liquid chromatograph mass spectrometers have been used for the measurement of target components contained in a liquid sample. In a measurement of target components using a liquid chromatograph mass spectrometer, a liquid sample is initially introduced into the liquid chromatograph to separate the target components from each other by a column in the liquid chromatograph, and the separated components are subsequently introduced into the mass spectrometer. In the mass spectrometer, for example, each target component contained in the liquid sample is ionized by an electrospray ionization (ESI) source, and the resulting ions are separated from each other according to their mass-to-charge ratios and detected.

The ESI source includes an ESI probe. The ESI probe has a capillary through which a liquid sample flows and an ESI probe which has a nebulizer-gas passage surrounding the capillary. In the ESI probe, the liquid sample flowing through the capillary is electrically charged and transported to the tip of the ESI probe. At the tip of this probe, a stream of nebulizer gas blows off the liquid sample, whereby the liquid sample is broken into electrically charged droplets and sprayed into an ionization chamber. The charged droplets sprayed into the ionization chamber are atomized through the repetition of the process of increasing their surface electric field with the vaporization of the solvent (desolvation) and splitting into smaller droplets due to the repulsion between the electric charges, to be ultimately turned into ions. Due to the pressure difference between the ionization chamber which is at substantially atmospheric pressure and the mass spectrometry chamber which is a vacuum chamber located in the subsequent stage, the ions generated within the ionization chamber are drawn into the mass spectrometry chamber through an ion introduction port provided in the partition wall between the ionization chamber and the mass spectrometry chamber. Patent Literatures 1 and 2 disclose an ionization device equipped with a heated-gas supply mechanism in addition to the ESI probe in order to promote the desolvation in the ionization process by expelling a heated gas on the charged droplets sprayed from the ESI probe. This type of ionization device allows users to appropriately set the timing to expel the heated gas according to the characteristics of the liquid sample so as to promote the desolvation of a hard-to-ionize component of the sample and increase its ionization efficiency.

CITATION LIST

Patent Literature

Patent Literature 1: U.S. Pat. No. 5,412,208 A
Patent Literature 2: U.S. Pat. No. 6,759,650 B

SUMMARY OF INVENTION

Technical Problem

When a liquid sample is sprayed from the ESI probe, a gas current is generated within the ionization chamber. The ionization device described in Patent Literatures 1 and 2 allows the user to freely set the timing to spray the liquid sample from the ESI probe as well as the timing to expel the heated gas from the heated-gas supply mechanism. This ionization device may also be configured so that the heated-gas supply mechanism, which is provided apart from the ESI probe, expels the gas on the charged droplets sprayed from the ESI probe in a direction intersecting with the direction in which the charged droplets are sprayed (i.e., the central axis of the spray of the charged droplets from the ESI probe is not identical to that of the expulsion of the gas from the heated-gas supply mechanism). In that case, if there is a period of time during which there is no heated gas being expelled from the heated-gas supply mechanism while the liquid sample is sprayed from the ESI probe, a portion of the charged droplets of the liquid sample (and other particles) enters the heated-gas supply mechanism due to the gas current generated within the ionization chamber and consequently causes internal contamination of the heated-gas supply mechanism. Although the example described so far has been concerned with the case of ionizing a liquid sample by ESI, a similar problem also occurs in the case of ionizing samples by other ionization methods (e.g., atmospheric pressure chemical ionization: APCI).

Thus, in an ionization device configured to ionize components contained in a liquid sample by spraying the liquid sample from an ionization probe and promoting its desolvation by expelling a gas from a heated-gas supply mechanism provided apart from the ionization probe, the problem to be solved by the present invention is to prevent the contamination of the heated-gas supply mechanism.

Solution to Problem

The present invention developed for solving the previously described problem is an ionization device to be installed for an ionization chamber separated from an analysis chamber by a partition wall in which an ion introduction port is provided, the ionization device including:

an ionization probe configured to spray a liquid sample;
a heated-gas supply mechanism including a gas supply source and a heating section for heating a gas supplied from the gas supply source, the heated-gas supply mechanism configured to expel the gas in a direction intersecting with the direction in which the liquid sample is sprayed from the ionization probe; and
a controller configured to control an operation of the heated-gas supply mechanism so that the gas is continuously expelled from the heated-gas supply mechanism regardless of the presence or absence of an operation by a user while the liquid sample is sprayed from the ionization probe.

Another mode of the present invention developed for solving the previously described problem is a method for ionizing a liquid sample within an ionization chamber separated from an analysis chamber by a partition wall in which an ion introduction port is provided, the method including the steps of:

introducing the liquid sample into an ionization probe to spray the liquid sample into the ionization chamber, and
continuously expelling a gas from a heated-gas supply mechanism in a direction intersecting with the direction in which the liquid sample is sprayed from the ionization probe, regardless of the presence or absence of an operation by a user, where the heated-gas supply mechanism, which is provided apart from the ionization probe, includes a gas supply source and a heating section for heating the gas supplied from the gas supply source.

Advantageous Effects of Invention

In the ionization device and ionization method according to the present invention, a stream of gas is expelled from the heated-gas supply mechanism provided apart from the ionization probe in a direction intersecting with the direction in which the liquid sample is sprayed from the ionization probe. In other words, the central axis of the spray of the charged droplets from the ESI probe is not identical to that of the expulsion of the gas from the heated-gas supply mechanism. While a liquid sample is sprayed from the ionization probe, the operation of the heated-gas supply mechanism is controlled so that the gas is continuously expelled from the heated-gas supply mechanism regardless of the presence or absence of an operation by a user. That is to say, the gas-expelling operation by the heated-gas supply mechanism is automatically initiated simultaneously with or earlier than the point in time where the spraying of the liquid sample is initiated, and the gas-expelling operation by the heated-gas supply mechanism is continued to a point in time simultaneous with or later than the completion of the spraying of the liquid sample. The stream of the gas ejected from the heated-gas supply mechanism in this manner prevents the liquid sample from entering the heated-gas supply mechanism and causing internal contamination.

DESCRIPTION OF EMBODIMENTS

Figure 1:
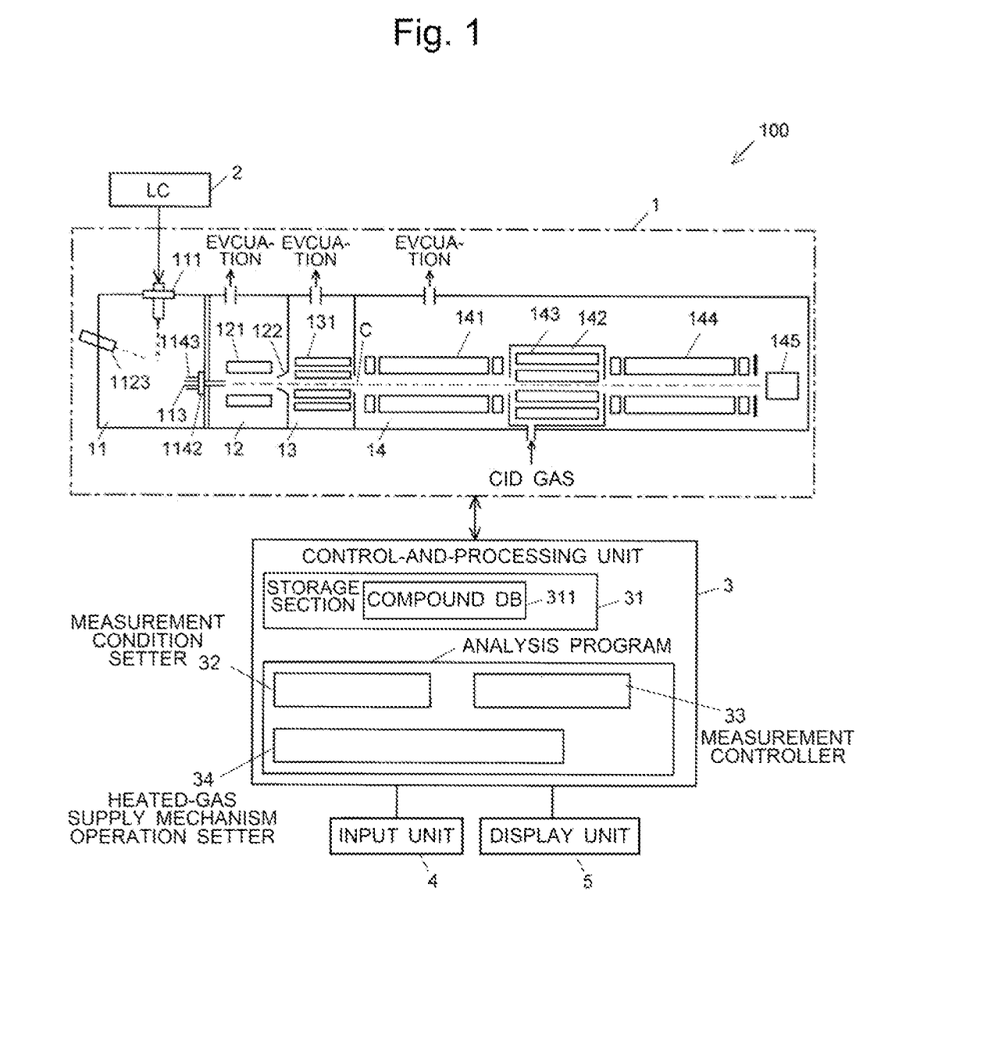
FIG. 1 is a configuration diagram of the main components of a liquid chromatograph mass spectrometer including an embodiment of the ionization device according to the present invention.

An embodiment of the ionization device according to the present invention is hereinafter described with reference to the drawings. FIG. 1 is a schematic configuration diagram of a liquid chromatograph mass spectrometer 100 including the ionization device according to the present embodiment.

The liquid chromatograph mass spectrometer 100 in the present embodiment is roughly divided into a liquid chromatograph 2, a mass spectrometer 1, and a control-and-processing unit 3 configured to control the previously mentioned units.

The mass spectrometer 1 includes an ionization chamber 11 which is at substantially atmospheric pressure and a vacuum chamber which is evacuated by a vacuum pump (not shown). The vacuum chamber is internally divided into a first intermediate vacuum chamber 12, second intermediate vacuum chamber 13 and analysis chamber 14, which have the configuration of a differential pumping system with the degree of vacuum increased in the previously mentioned order. The ionization chamber 11 communicates with the first intermediate vacuum chamber 12 through a desolvation tube 113 provided in the partition wall separating these two chambers. The first intermediate vacuum chamber 12 communicates with the second intermediate vacuum chamber 13 through the opening at the apex of a skimmer 122 provided in the partition wall separating these two chambers. The second intermediate vacuum chamber 13 communicates with the analysis chamber 14 through an opening formed in the partition wall separating these two chambers.

The ionization chamber 11 is equipped with an electrospray ionization (ESI) probe 111, heated-gas supply mechanism 112 and drying-gas supply mechanism 114. Into the ESI probe 111, a liquid sample in its original form may be directly introduced, or the liquid sample may be introduced after its components have been separated from each other by the column in the liquid chromatograph.

Figure 2:
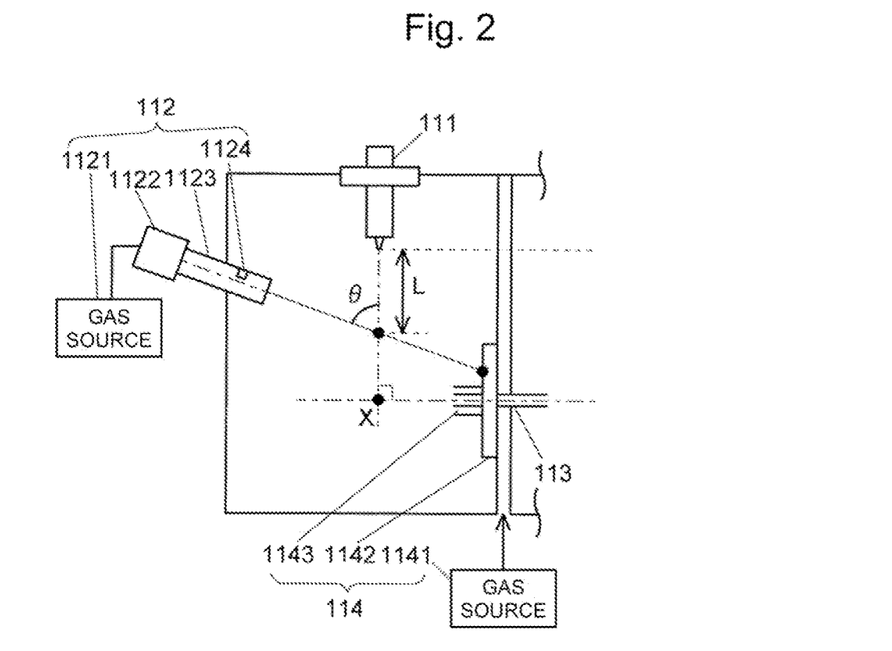
FIG. 2 is a diagram illustrating the configuration of the components installed for the ionization chamber in the present embodiment.

The heated-gas supply mechanism 112 includes a gas supply source 1121, heater 1122 (which corresponds to the heating section in the present invention), heated-gas supply probe 1123 and temperature measurement element 1124 (see FIG. 2; in FIG. 1, only the heated-gas supply probe 1123 is shown). The heated-gas supply probe 1123 is located at a predetermined distance from the tip of the ESI probe 111 so as to expel a stream of heated gas at a predetermined flow rate (e.g., 1.0-30.0 L/min) on the charged droplets sprayed from the ESI probe 111. The aforementioned flow rate is regulated, for example, by a flow regulator in the gas supply source 1121. As for the heated gas, dry air or nitrogen gas may be used, for example. The power supply to the heater 1122 is controlled by a measurement controller 33 (which will be described later). It is also possible to pass the gas without supplying power to the heater 1122. For example, when the target component is a compound that is easy to be decomposed or denatured by heat, no power is supplied to the heater 1122 and a gas at ordinary temperature is expelled. When supplying power to the heater 1122 and heating the gas, the measurement controller 33 conducts a feedback control so that the temperature of the gas measured with the temperature measurement element 1124 is maintained within the vicinity of the target temperature (e.g., 400 degrees Celsius).

The drying-gas supply mechanism 114 includes a gas supply source 1141, heating block 1142 and drying-gas supply tube 1143 (see FIG. 2; in FIG. 1, only the heating block 1142 and the drying-gas supply tube 1143 are shown). The drying-gas supply tube 1143 is coaxially arranged with the desolvation tube 113 so as to surround the same tube 113, and is configured to expel a stream of drying gas against the ion current flowing into the desolvation tube 113. The flow rate of the drying gas is regulated, for example, by a flow regulator in the gas supply source 1141. As for the heated gas, dry air or nitrogen gas may be used, for example. Although the gas supply sources 1121 and 1141 in the present embodiment are separately provided, a system of branch lines extending from a single gas supply source may alternatively be installed to supply the heated-gas supply mechanism 112 and the drying-gas supply mechanism 114 with their respective gases.

Figure 3:
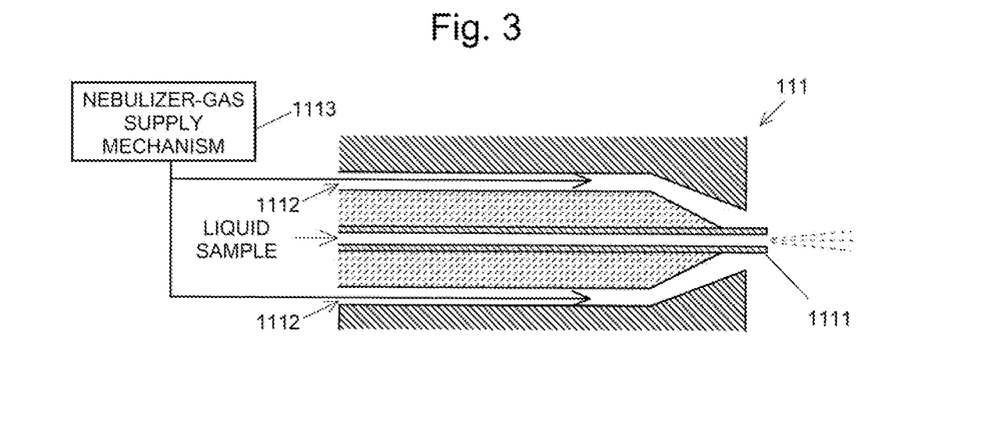
FIG. 3 is an enlarged view of the tip portion of an ESI probe in the ionization device according to the present embodiment.

The EST probe 111 includes, as shown in the partially enlarged view of its tip portion in FIG. 3, a capillary 1111 through which a liquid sample flows, a nebulizer-gas passage 1112 formed on the outside of the capillary 1111, and a nebulizer-gas supply mechanism 1113 configured to supply a nebulizer gas to the nebulizer-gas passage 1112. In the ESI probe 111, the liquid sample flowing through the capillary 1111 is electrically charged by a predetermined amount of voltage (EST voltage, which is typically a positive or negative voltage of an appropriate magnitude equal to or less than 5.0 kV) and transported to the tip of the ESI probe 111, at which tip a stream of nebulizer gas (e.g., nitrogen gas) at a predetermined flow rate (e.g., 0.5-5.0 L/min) blows off the liquid sample, breaking it into charged droplets and spraying them into the ionization chamber 11. The flow rate is regulated by the flow regulator in the gas supply source 1121, for example.

The charged droplets sprayed into the ionization chamber 11 are atomized through the repetition of the process of increasing their surface electric field with the vaporization of the solvent (desolvation) and splitting into smaller droplets due to the repulsion between the electric charges, to be ultimately turned into ions. The heated gas expelled from the heated-gas supply probe 1123 and hitting the charged droplets promotes the desolvation of those charged droplets.

The ions generated within the ionization chamber 11 are drawn through the desolvation tube 113 into the first intermediate vacuum chamber 12 in the subsequent stage due to the lower pressure of this first intermediate vacuum chamber 12. The desolvation tube 113 is surrounded by the drying-gas supply tube 1143, to which the drying gas from the gas supply source 1141 is supplied after being heated by the heating block 1142 which forms a portion of the partition wall. The drying gas supplied from the drying-gas supply tube 1143 is expelled in an opposite direction to the ion current flowing into the desolvation tube 113, thereby promoting the desolvation of the ion current. The desolvation tube 113 is also heated to a predetermined temperature (e.g., 300 degrees Celsius) by the heating block 1142. Therefore, this desolvation tube 113 also promotes the desolvation of the ion current flowing through the same tube. The heating block 1142 is heated by a heating section which is not shown (e.g., by supplying power to a heater).

The first intermediate vacuum chamber 12 contains an ion guide 121 formed by a plurality of rod-shaped electrodes. The ions introduced through the desolvation tube 113 are converged into the vicinity of the ion beam axis (the central axis of the direction of flight of the ions) C by the ion guide 121 and enter the second intermediate vacuum chamber 13 through the opening at the apex of the skimmer 122.

The second intermediate vacuum chamber 13 contains an ion guide 131 formed by a plurality of rod-shaped electrodes. The ions introduced through the opening at the apex of the skimmer 122 are converged into the vicinity of the ion beam axis C by the ion guide 131 and enter the analysis chamber 14 through the opening formed in the partition wall separating the second intermediate vacuum chamber 13 and the analysis chamber 14.

The analysis chamber 14 contains a front quadrupole mass filter 141, collision cell 142, rear quadrupole mass filter 144 and ion detector 145. Each of the front and rear quadrupole mass filters 141 and 144 is formed by main rods, pre-rods located in front of the main rods and post-rods located at the back of the main rods. The collision cell 142 contains a multipole rod electrode 143 which converges ions within the collision cell 142 into the vicinity of the ion beam axis C. The collision cell 142 also has a CID gas introduction section for introducing an inert gas, such as nitrogen gas, as the collision induced dissociation (CID) gas.

Among the ions which have entered the analysis chamber 14, an ion having a predetermined mass-to-charge ratio is selected by the front quadrupole mass filter 141 as a precursor ion and allowed to enter the collision cell 142. Within the collision cell 142, the precursor ion is fragmented into product ions due to the collision with the CID gas. The ions generated within the collision cell 142 are mass-separated by the rear quadrupole mass filter 144 and detected by the ion detector 145. The output signals from the ion detector 145 are sent to the control-and-processing unit 3 and stored in a storage section 31 (which will be described later).

The control-and-processing unit 3 includes a storage section 31. The storage section 31 contains a compound database (compound DB) 311 recording information related to various compounds, such as the measurement conditions and analytical parameters. In the present embodiment, the information of the operation parameters of the heated-gas supply mechanism 112 (e.g., the temperature and flow rate of the heated gas) to be used in the measurement of each compound is also recorded in the compound database 311.

The control-and-processing unit 3 further includes a measurement condition setter 32, measurement controller 33 (which corresponds to the controller in the present invention) and heated-gas supply mechanism operation setter 34 as its functional blocks. The control-and-processing unit 3 is actually a commonly used computer, with these functional blocks embodied by executing, on the processor, dedicated software installed beforehand. An input unit 4 including a mouse, keyboard and other related devices, as well as a display unit 5 consisting of a liquid crystal display or similar device, are connected to the control-and-processing unit 3.

The heated-gas supply mechanism operation setter 34 allows for the setting of whether or not to permit the setting of a measurement condition for discontinuing the gas-expelling operation from the heated-gas supply mechanism 112 during the period of time where a liquid sample or mobile phase is sprayed from the ESI probe 111. Only a specific group of individuals are permitted to access the heated-gas supply mechanism operation setter 34 (for example, a designated type of user, such as an administrator of the device, can access it when he/she has logged in the device with a specified ID and password). Average users, including analysis operators, are not permitted to access it. The device in the present embodiment is configured to reject the setting of the measurement condition for discontinuing the gas-expelling operation from the heated-gas supply mechanism 112 while a liquid sample is sprayed, except in the special case where the designated type of user has changed the setting of the heated-gas supply mechanism operation setter 34.

The mass spectrometer 1 in the present embodiment is characterized by the arrangement and operation of the heated-gas supply mechanism 112 in the ionization chamber 11. The configuration of the ionization chamber 11 is hereinafter described. FIG. 2 is an enlarged view of the ionization chamber 11 and the surrounding area in the mass spectrometer 1.

The ESI probe 111 is arranged so that its spraying axis (the central axis of the travelling direction of the charged droplets sprayed from the ESI probe 111) orthogonally intersects with the central axis of the desolvation tube 113 at intersection point X. In the present embodiment, the most preferable mode of configuration is adopted: the spraying axis of the ESI probe 111 extends vertically, while the central axis of the desolvation tube 113 extends horizontally. The heated-gas supply probe 1123 is arranged so that the expelling direction of the heated-gas supply probe 1123 (the central axis of the travelling direction of the heated gas) and the spraying axis of the ESI probe 111 make an angle θ that is within a range from 60 degrees to 80 degrees, inclusive. This range of angle θ is based on the result of a study conducted by the inventor of the present application in a previous application (PCT/JP2021/030953). An angle θ that is not smaller than 60 degrees prevents physical interference between the tip of the ESI probe 111 and the heated-gas supply probe 1123, thereby facilitating the arrangement of the two devices. An angle θ that is not larger than 80 degrees lowers the possibility of the liquid sample being boiled within the ESI probe 111 due to the heated gas hitting the tip portion of the ESI probe 111. The desolvation tube 113, which is a capillary provided in the partition wall between the ionization chamber 11 and the first intermediate vacuum chamber 12, is heated to a predetermined temperature by the heating block 1142 which forms a portion of the partition wall.

The heated-gas supply probe 1123 and the heating block 1142 are arranged so that the upper portion of the heating block 1142 (i.e., the portion located higher than the desolvation tube 113) is located on the central axis of the expelling direction of the gas from the heated-gas supply probe 1123. In other words, the heated gas supplied from the heated-gas supply probe 1123 hits the charged droplets at a position between the tip of the ESI probe 111 and the intersection point X of the spraying axis of the ESI probe 111 and the central axis of the desolvation tube 113 (at distance L from the tip of the ESI probe 111). For example, this distance L is set within a range from 2.5 mm to 10 mm, inclusive. This range of distance L is also based on the result of the study conducted by the inventor of the present application in the previous application (PCT/JP2021/030953). A distance L that is not smaller than 2.5 mm lowers the possibility of electric discharge which can occur if the tip of the ESI probe 111 is extremely close to the tip of the heated-gas supply probe 1123. A distance L that is not larger than 10 mm allows the heated gas to hit the charged droplets at a position higher than the central axis of the desolvation tube 113 to promote the desolvation and thereby improve the measurement sensitivity for ions in a commonly used ionization device in which there is a height difference of 10.5 mm between the tip of the ESI probe 111 and the central axis of the desolvation tube 113.

According to the present embodiment, since the heated gas hits the charged droplets sprayed from the tip of the ESI probe 111 before those droplets reach the desolvation tube 113, the charged droplets are unlikely to be drawn into the desolvation tube 113 in the form of droplets and ultimately enter the analysis chamber 14 (or the first intermediate vacuum chamber 12, second intermediate vacuum chamber 13 and analysis chamber 14). Supplying the heated gas to such a position also prevents particles other than the ions resulting from the liquid sample (such as unwanted neutral molecules or ions which are present within the ionization chamber 11) from being drawn into the desolvation tube 113 and ultimately reaching the analysis chamber 113. Thus, the contamination of the analysis chamber and preceding vacuum chambers is reduced, and the robustness of the mass spectrometer 1 is enhanced.

Figure 4:
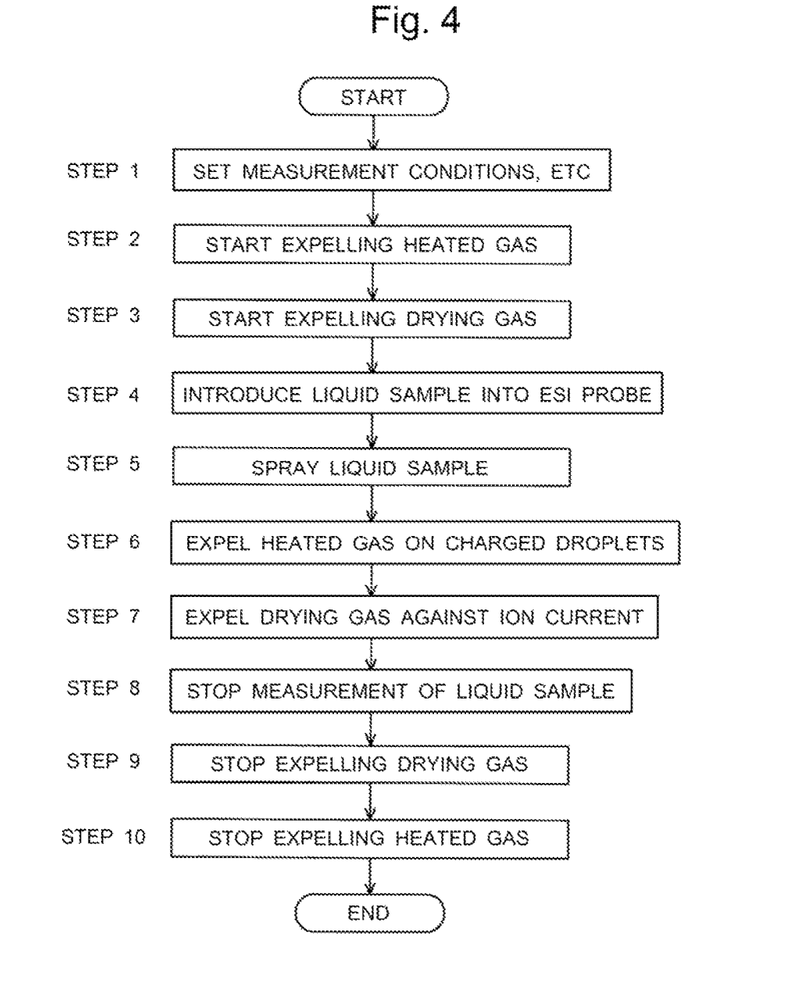
FIG. 4 is a flowchart showing an embodiment of the ionization method according to the present invention.

Referring to the flowchart in FIG. 4, an example of the measurement of a liquid sample using the liquid chromatograph mass spectrometer 100 according to the present embodiment is hereinafter described.

A user issues a command for a measurement of a liquid sample. Upon receiving this command, the measurement condition setter 32 displays a list of the compounds recorded in the compound database 311 on the screen of the display unit 5. The user selects a compound (target component) to be subjected to the measurement from the displayed list. Then, the measurement condition setter 32 retrieves, from the compound database 311, the measurement conditions and analysis parameters for that compound as well as the operation parameters of the heated-gas supply mechanism 112 and displays those items of information on the screen of the display unit 5. After modifying the measurement conditions and other settings as needed, the user confirms the measurement conditions and other settings (Step 1). After the measurement conditions and other settings have been confirmed by the user, the measurement condition setter 32 creates a batch file for performing the measurement and analysis of the sample and stores it in the storage section 31.

As noted earlier, the measurement conditions to be set by the user include the operation parameters of the heated-gas supply mechanism 112. However, the measurement condition setter 32 is configured so that it does not permit the setting of a measurement condition for discontinuing the gas-expelling operation during a period of time where a liquid sample or mobile phase is sprayed from the ESI probe 111, as long as the heated-gas supply mechanism operation setter 34 is set in a special way that permits the setting of a measurement condition for discontinuing the gas-expelling operation from the heated-gas supply mechanism 112 during the period of time where a liquid sample or mobile phase is sprayed from the ESI probe 111. As another possibility, when the user has set a measurement condition for discontinuing the gas-expelling operation from the heated-gas supply mechanism 112 during a period of time where a liquid sample or mobile phase is sprayed from the ESI probe 111, the measurement condition setter 32 can disregard the user's setting and override the measurement conditions by automatically applying operation parameters (e.g., the temperature and flow rate of the heated gas) used in the preceding period of time.

After the batch file has been created, the user issues a command to initiate the measurement, whereupon the measurement controller 33 executes the batch file and controls the related sections of the liquid chromatograph mass spectrometer 100 to perform a measurement of the target component contained in the liquid sample.

At the beginning of the measurement, the first intermediate vacuum chamber 12, second intermediate vacuum chamber 13 and analysis chamber 14 within the vacuum chamber are individually evacuated to their respective predetermined degrees of vacuum. Meanwhile, the power supply to the heater 1122 in the heated-gas supply mechanism 112 is initiated, and the supply of the gas from the gas supply source 1121 is also initiated at a predetermined flow rate, e.g., at 5 L/min (Step 2). After the power supply to the heater 1122 has been initiated, the temperature of the gas which has passed through the heater 1122 is measured with the temperature measurement element 1124, and the amount of electric energy supplied to the heater 1122 is regulated so that the measured temperature is stabilized at a predetermined temperature (e.g., 400 degrees Celsius). The gas heated by the heater 1122 is expelled into the ionization chamber 11. The drying-gas supply mechanism 114 also supplies a stream of gas (drying gas) from the gas supply source 1141, and this gas is expelled from the drying-gas supply tube 1143 into the ionization chamber 11 (Step 3). Initiating the expulsion of the heated gas simultaneously with or earlier than that of the drying gas prevents unwanted substances within the ionization chamber 11 from entering the heated-gas supply mechanism 112 due to the gas current generated by the expulsion of the drying gas.

After the chambers 12-14 in the vacuum chamber have been evacuated to their respective predetermined degrees of vacuum, and the gas in the heated-gas supply mechanism 112 has reached the predetermined temperature, the measurement controller 33 injects, from an injector, a liquid sample previously set in the liquid chromatograph 2 (or in an autosampler connected to the liquid chromatograph 2). The liquid sample injected into the liquid chromatograph 2 is carried into the column by the flow of the mobile phase, and the components of the sample are separated from each other in the column.

The various components in the liquid sample separated in the column of the liquid chromatograph 2 are sequentially introduced into the ESI probe 111 along with the mobile phase (Step 4) and sprayed into the ionization chamber 11 in the form of charged droplets (Step 5). The heated gas expelled from the heated-gas supply probe 1123 hits these charged droplets (Step 6), thereby promoting the desolvation of those droplets. The ion current produced from the charged droplets is drawn into the first intermediate vacuum chamber 12 through the desolvation tube 113 due to the pressure difference between the ionization chamber 11 and the first intermediate vacuum chamber 12. In this process, the desolvation is further promoted since the drying-gas current is expelled from the drying-gas supply tube 1143 against the ion current (Step 7), as well as since the ion current passes through the heated desolvation tube 113.

After the measurement of the liquid sample has been completed (Step 8), the measurement controller 33 discontinues the supply of the mobile phase in the liquid chromatograph 2. Subsequently, it discontinues the supply of the gas from the gas supply source 1141 in the drying-gas supply mechanism 114 (Step 9). Simultaneously with this (or later than the discontinuation of the supply of the gas from the gas supply source 1141), the measurement controller 33 discontinues the supply of the gas from the gas supply source 1121 in the heated-gas supply mechanism 112 (Step 10). Discontinuing the expulsion of the heated gas simultaneously with or later than that of the drying gas prevents unwanted substances within the ionization chamber 11 from entering the heated-gas supply mechanism 112 due to the gas current generated by the expulsion of the drying gas.

Thus, in the liquid chromatograph mass spectrometer 100 according to the present embodiment, the supply of the heated gas from the heated-gas supply probe 1123 is initiated before the mobile phase or liquid sample is introduced from the liquid chromatograph 2 into the ESI probe 111, and the heated gas is continuously supplied throughout the period of time where the mobile phase or liquid sample is introduced into the ESI probe 111.

When the various components in the liquid sample are sprayed from the ESI probe 111 along with the mobile phase, a gas current is generated within the ionization chamber 11. Additionally, the drying gas is also expelled from the drying-gas supply mechanism 114 in an opposite direction to the ion current. In an ionization device in which, as in the present embodiment, the heated-gas supply mechanism 112 is provided apart from the ESI probe 111 and arranged so as to expel a stream of gas on the charged droplets sprayed from the ESI probe 111 in a direction intersecting with the direction in which the charged droplets are sprayed (i.e., the central axis of the spray of the charged droplets from the ESI probe 111 is not identical to that of the expulsion of the gas from the heated-gas supply mechanism 112), a portion of the charged droplets of the components in the liquid sample, or those of the mobile phase, may possibly enter the heated-gas supply mechanism 112 due to the gas current generated within the ionization chamber 11 and cause internal contamination of the heated-gas supply mechanism 112, if there is no gas being expelled from the heated-gas supply probe 1123. A component in the liquid sample which entered the heated-gas supply mechanism 112 in the previous measurement may possibly hit the liquid sample in the next measurement along with the heated gas and contaminate the new sample. In order to prevent this contamination, the heated-gas supply mechanism 112 must be cleaned for each measurement, which requires a considerable amount of time and labor. According to the present embodiment, the measurement controller 33 continues the operation of expelling the heated gas from the heated-gas supply probe 1123 throughout the period of time where a liquid sample is introduced to the ESI probe 111. This stream of gas prevents the components in the liquid sample or the mobile phase from entering the heated-gas supply mechanism 112.

In the previously described measurement example, the measurement controller 33 operates the heated-gas supply mechanism 112 synchronously with the beginning and ending of the measurement of the liquid sample so that the heated gas begins to be expelled from the heated-gas supply probe 1123 into the ionization chamber before the liquid sample and the mobile phase are introduced into the ESI probe 111. It is also possible to adopt other modes of operation. For example, the supply of the gas from the gas supply source 1121 in the heated-gas supply mechanism 112 may be controlled to simultaneously begin and end with the beginning and ending of the supply of the nebulizer gas by the nebulizer-gas supply mechanism 1113 in the ESI probe 111. The nebulizer gas is a gas by which the liquid sample or mobile phase introduced into the ESI probe 111 is sprayed into the ionization chamber 11. Therefore, by synchronizing the expulsion of the gas from the heated-gas supply probe 1123 with that of the nebulizer gas, it is possible to assuredly prevent the components in the liquid sample or other unwanted particles from entering the heated-gas supply mechanism 112. In summary, any method can be adopted as long as the gas can be continuously expelled from the heated-gas supply mechanism 112 at least while a liquid sample is sprayed from the ESI probe 111.

In the previously described measurement example, a single liquid sample is subjected to the measurement. There is also the case where a plurality of liquid samples are set in an autosampler and sequentially subjected to the measurement. In this type of measurement, a standby time may be provided between the measurements of the liquid samples. For example, when a gradient analysis is performed in the liquid chromatograph 2, a period of time for equilibrating the mobile phase in the liquid chromatograph 2 is provided after the measurement for one liquid sample has been initiated. As in this case, when a period of time during which no liquid sample (or the like) is introduced into the ESI probe 111 (standby period) is present between the measurements of liquid samples, the expulsion of the heated gas from the heated-gas supply probe 1123 into the ionization chamber 11 may be temporarily suspended during that period of time, or the flow rate of the heated gas may be lowered from a flow rate for measurement time to a flow rate for standby time (where the flow rate for measurement time is higher than the flow rate for standby time). Needless to say, the expulsion of the gas from the heated-gas supply probe 1123 into the ionization chamber 11 may be performed at the same flow rate in both the measurement period and the standby period.

In the previously described measurement example, the gas supplied from the gas supply source 1121 is heated to a predetermined temperature by the heater 1122 in the heated-gas supply mechanism 112 before the gas is expelled from the heated-gas supply probe 1123 into the ionization chamber 11. In some cases, the power supply to the heater 1122 may be omitted so that the gas supplied from the gas supply source 1121 is expelled into the ionization chamber 11 without being heated. For example, expelling a non-heated gas is preferable when the target component is a compound that is easy to be decomposed or denatured by heat. For a measurement of this type of target component, it is preferable to additionally omit the power supply to the heating block 1142, in which case a non-heated drying gas is expelled against the ion current and the ion current is introduced into a non-heated desolvation tube.

Although the drying-gas supply mechanism 114 is employed in the previously described measurement example, it is actually unnecessary to employ the drying-gas supply mechanism 114 (or the measurement may be performed without activating the still provided drying-gas supply mechanism 114). In that case, the gas current which pushes the ion current back into the ionization chamber 11 is less likely to be generated than in the case where the drying gas is expelled. Accordingly, in the case of performing a measurement without expelling the drying gas against the ion current, the flow rate of the gas expelled from the heated-gas supply probe 1123 into the ionization chamber 11 may be lower than in the case where the drying gas is expelled against the ion current. For example, the measurement controller 33 may be configured to control the operation of the heated-gas supply mechanism 112 so that the gas is expelled from the heated-gas supply mechanism 112 at a predetermined first flow rate when there is a gas being expelled from the drying-gas supply mechanism 114, while the gas is expelled from the heated-gas supply mechanism 112 at a second flow rate which is lower than the first flow rate, when there is no gas being expelled from the drying-gas supply mechanism 114.

Each of the previous embodiment and measurement examples is a mere example and can be appropriately changed or modified along the gist of the present invention.

In the previous embodiment, the user is allowed to set measurement conditions including the operation parameters of the heated-gas supply mechanism 112 (e.g., the temperature and flow rate of the heated gas). Alternatively, the user may be prohibited from setting the operation parameters of the heated-gas supply mechanism 112. In that case, for example, the measurement condition setter 32 can be configured to automatically set measurement conditions under which the heated-gas supply mechanism 112 is operated using predetermined operation parameters for the period of time determined by the measurement conditions set by the user during which the liquid sample or mobile phase is sprayed from the ESI probe 111. The heated-gas supply mechanism operation setter 34 provided in the previous embodiment is also an optional component. What is required in the previous embodiment is that a stream of gas (heated or non-heated) should be continuously expelled from the heated-gas supply mechanism 112 while a liquid sample or mobile phase is sprayed from the ESI probe 111, regardless of the presence or absence of an operation by the user. Any appropriate configuration can be adopted as long as this requirement is met.

The configuration applied in the previously described liquid chromatograph mass spectrometer 100 can also be similarly applied in a mass spectrometer which does not include a liquid chromatograph and is configured so that a liquid sample is directly introduced into the ESI probe. In that case, what is required is that a stream of gas should be continuously expelled from the heated-gas supply probe 1123 into the ionization chamber while a liquid sample is sprayed from the ESI probe.

The previous embodiment has been concerned with an ESI source, i.e., an ionization device having an ionization chamber 11 equipped with an ESI probe 111. A similar configuration to the previous embodiment can also be applied in an APCI source, i.e., an ionization device which includes, in place of the ESI probe 111, an ionization probe for spraying a liquid sample and a corona needle for atmospheric pressure chemical ionization (APCI). Furthermore, a similar configuration to the previous embodiment can also be applied in a so-called "dual ionization" device, which is an ionization device equipped with both an EST probe and a corona needle for APCI. In the previous embodiment, the ESI probe 111 and the desolvation tube 113 are arranged so that the direction in which the liquid sample is sprayed from the EST probe 111 orthogonally intersects with the central axis of the desolvation tube 113 (orthogonal arrangement). Although this is a preferable mode, the present invention can yet be applied in other types of arrangements. The heated-gas supply mechanism, which should be provided apart from the ionization probe, may be arranged in any appropriate form other than the preferable mode of the arrangement shown in the previous embodiment as long as the gas from the heated-gas supply mechanism is expelled in a direction intersecting with the direction in which the liquid sample is sprayed from the ionization probe (i.e., the central axis of the spray of the charged droplets from the ionization probe is not identical to that of the expulsion of the gas from the heated-gas supply mechanism).

The device according to the previous embodiment is configured to perform mass spectrometry of generated ions. An ionization device similar to the previous embodiment can also be employed in a device which performs a different kind of measurement, such as ion mobility spectrometry. As for the mass spectrometry, there are various possible configurations for the mass spectrometry unit (such as a single quadrupole, ion trap, or time-of-flight type) other than the triple quadrupole type shown in the previous embodiment.

Modes

It is evident for a person skilled in the art that the previously described illustrative embodiment is a specific example of the following modes of the present invention.
(Clause 1)
One aspect of the present invention is an ionization device to be installed for an ionization chamber separated from an analysis chamber by a partition wall in which an ion introduction port is provided, the ionization device including:
    an ionization probe configured to spray a liquid sample;
    a heated-gas supply mechanism including a gas supply source and a heating section for heating a gas supplied from the gas supply source, the heated-gas supply mechanism configured to expel the gas in a direction intersecting with the direction in which the liquid sample is sprayed from the ionization probe; and
    a controller configured to control an operation of the heated-gas supply mechanism so that the gas is continuously expelled from the heated-gas supply mechanism regardless of the presence or absence of an operation by a user while the liquid sample is sprayed from the ionization probe.
(Clause 7)
Another mode of the present invention is a method for ionizing a liquid sample within an ionization chamber separated from an analysis chamber by a partition wall in which an ion introduction port is provided, the method including the steps of:

introducing the liquid sample into an ionization probe to spray the liquid sample into the ionization chamber; and continuously expelling a gas from a heated-gas supply mechanism in a direction intersecting with the direction in which the liquid sample is sprayed from the ionization probe, regardless of the presence or absence of an operation by a user, where the heated-gas supply mechanism, which is provided apart from the ionization probe, includes a gas supply source and a heating section for heating the gas supplied from the gas supply source.

When a liquid sample is sprayed from an ionization probe into the ionization chamber, a gas current is generated within the ionization chamber. A conventional ionization device allows the user to appropriately set the timing to spray the liquid sample from an ESI probe as well as the timing to expel the heated gas from the heated-gas supply mechanism. This ionization device may have the configuration in which the heated-gas supply mechanism, which is provided apart from the ESI probe, expels the gas on the charged droplets sprayed from the EST probe in a direction intersecting with the direction in which the charged droplets are sprayed (i.e., the central axis of the spray of the charged droplets from the ESI probe is not identical to that of the expulsion of the gas from the heated-gas supply mechanism). In that case, if there is no gas being expelled from the heated-gas supply mechanism while a liquid sample is sprayed from the ionization probe, a portion of the charged droplets of the liquid sample enters the heated-gas supply mechanism due to the gas current generated within the ionization chamber and thereby causes internal contamination of the heated-gas supply mechanism. A component in the liquid sample which entered the heated-gas supply mechanism in the previous measurement may possibly hit the liquid sample in the next measurement along with the heated gas and contaminate the new sample. In order to prevent this contamination, the heated-gas supply mechanism must be cleaned for each measurement, which requires a considerable amount of time and labor.

In the ionization device according to Clause 1 and the ionization method according to Clause 7, while a liquid sample is sprayed from the ionization probe, the operations of the ionization probe and the heated-gas supply mechanism are controlled so that the gas is continuously expelled from the heated-gas supply mechanism regardless of the presence or absence of an operation by a user. That is to say, the gas-expelling operation by the heated-gas supply mechanism is automatically initiated simultaneously with or earlier than the point in time where the spraying of the liquid sample is initiated, and the gas-expelling operation by the heated-gas supply mechanism is continued to a point in time simultaneous with or later than the completion of the spraying of the liquid sample. The stream of the gas ejected from the heated-gas supply mechanism in this manner prevents the liquid sample from entering the heated-gas supply mechanism.

(Clause 2)

In the ionization device according to Clause 2, which is one mode of the ionization device according to Clause 1, the heated-gas supply mechanism is capable of performing a heating operation in which the gas supplied from the gas supply source is expelled after being heated by the heating section, and a non-heating operation in which the gas supplied from the gas supply source is expelled without being heated by the heating section.

In the ionization device according to Clause 2, when the target component to be subjected to the measurement is easy to be decomposed or denatured by heat, the heated-gas supply mechanism can be operated in the non-heating mode, whereby the liquid sample is prevented from entering and contaminating the heated-gas supply mechanism, while the desolvation of the charged droplets is still promoted by the gas.

(Clause 3)

In the ionization device according to Clause 3, which is one mode of the ionization device according to Clause 1 or 2:

the ionization probe includes a nebulizer-gas supply mechanism configured to supply a nebulizer gas for spraying the liquid sample; and the controller is configured to control the operation of the heated-gas supply mechanism synchronously with an operation of the nebulizer-gas supply mechanism.

In the ionization device according to Clause 3, the operation of the heated-gas supply mechanism is synchronized with that of the nebulizer-gas supply mechanism which supplies a nebulizer gas for spraying a liquid sample in an EST probe, in such a manner that the heated-gas supply mechanism continuously expels the gas while a liquid sample is sprayed by the nebulizer gas. Therefore, the sprayed liquid sample can be assuredly prevented from entering the heated-gas supply mechanism and causing internal contamination.

(Clause 4)

In the ionization device according to Clause 4, which is one mode of the ionization device according to one of Clauses 1-3, the controller is further configured to control the operation of the heated-gas supply mechanism so that the gas is expelled from the heated-gas supply mechanism at a predetermined flow rate for measurement time during a measurement period in which a measurement of the liquid sample is performed, while the gas is expelled from the heated-gas supply mechanism at a flow rate for standby time during a standby period in which no measurement of the liquid sample is performed, where the flow rate for standby time is lower than the flow rate for measurement time.

In the ionization device according to Clause 4, the usage of the gas supplied from the heated-gas supply mechanism can be reduced by lowering the flow rate of the same gas during the standby period in which no measurement of a liquid sample is performed. The flow rate for standby time may be zero (i.e., the expulsion of the gas may be discontinued) in the case where no liquid is sprayed from an ESI probe during the standby period in which no measurement of the liquid sample is performed, or in the case where the liquid sprayed from the ESI probe during the standby period is not the type of liquid that contaminates the heated-gas supply mechanism.

(Clause 5)

The ionization device according to Clause 5, which is one mode of the ionization device according to one of Clauses 1-4, further includes a drying-gas supply mechanism configured to expel a gas in an opposite direction to an ion current flowing into the ion introduction port.

In the ionization device according to Clause 5, the desolvation of the ion current being introduced into the ion introduction port can be further promoted by expelling the drying gas against the ion current.

(Clause 6)

In the ionization device according to Clause 6, which is one mode of the ionization device according to Clause 5, the controller is further configured to control the operation of the heated-gas supply mechanism so that the gas is expelled from the heated-gas supply mechanism at a predetermined first flow rate when there is the gas being expelled from the drying-gas supply mechanism, while the gas is expelled from the heated-gas supply mechanism at a second flow rate which is lower than the first flow rate, when there is no gas being expelled from the drying-gas supply mechanism.

In the ionization device according to Clause 6, when there is no gas being expelled from the drying-gas supply mechanism, the charged droplets of the liquid sample are less likely to enter the heated-gas supply mechanism than when there is a gas being expelled from the drying-gas supply mechanism. The usage of the gas supplied from the heated-gas supply mechanism can be reduced by lowering the flow rate of the same gas when there is no gas being expelled from the drying-gas supply mechanism.

REFERENCE SIGNS LIST

100 . . . Liquid Chromatograph Mass Spectrometer
1 . . . Mass Spectrometer
11 . . . Ionization Chamber
111 . . . ESI Probe
1111 . . . Capillary
1112 . . . Nebulizer-Gas Passage
1113 . . . Nebulizer-Gas Supply Mechanism
112 . . . Heated-Gas Supply Mechanism
1121 . . . Gas Supply Source
1122 . . . Heater
1123 . . . Heated-Gas Supply Probe
1124 . . . Temperature Measurement Element
113 . . . Desolvation Tube
114 . . . Drying-Gas Supply Mechanism
1141 . . . Gas Supply Source
1142 . . . Heating Block
1143 . . . Drying-Gas Supply Tube
12 . . . First Intermediate Vacuum Chamber
121 . . . Ion Guide
122 . . . Skimmer
13 . . . Second Intermediate Vacuum Chamber
131 . . . Ion Guide
14 . . . Analysis Chamber
141 . . . Front Quadrupole Mass Filter
142 . . . Collision Cell
143 . . . Multipole Rod Electrode
144 . . . Rear Quadrupole Mass Filter
145 . . . Ion Detector
2 . . . Liquid Chromatograph
3 . . . Control-and-Processing Unit
31 . . . Storage Section
311 . . . Compound Database
32 . . . Measurement Condition Setter
33 . . . Measurement Controller
34 . . . Heated-Gas Supply Mechanism Operation Setter
4 . . . Input Unit
5 . . . Display Unit
C . . . Ion Beam Axis
X . . . Intersection Point of Spraying Axis of ESI Probe and Central Axis of Ion Introduction Port
L . . . Distance from Tip of ESI Probe to Intersection Point of Spraying Axis of ESI Probe and Expelling Direction of Heated-Gas Supply Probe
θ . . . Angle Made by Spraying Axis of ESI Probe and Expelling Direction of Heated-Gas Supply Probe

The invention claimed is:

1. An ionization device to be installed for an ionization chamber separated from an analysis chamber by a partition wall in which an ion introduction port is provided, the ionization device comprising:
   an ionization probe configured to spray a liquid sample;
   a heated-gas supply mechanism including a gas supply source and a heating section for heating a gas supplied from the gas supply source, the heated-gas supply mechanism configured to expel the gas in a direction intersecting with a direction in which the liquid sample is sprayed from the ionization probe; and
   a controller configured to control an operation of the heated-gas supply mechanism so that the gas is continuously expelled from the heated-gas supply mechanism regardless of presence or absence of an operation by a user while the liquid sample is sprayed from the ionization probe;
   the controller configured to control a gas-expelling operation by the heated-gas supply mechanism to be automatically initiated simultaneously with or earlier than a point in time where spraying of the liquid sample is initiated, and to control a gas-expelling operation by the heated-gas supply mechanism to be continued to a point in time simultaneous with or later than a completion of the spraying of the liquid sample.

2. The ionization device according to claim 1, wherein the heated-gas supply mechanism is capable of performing a heating operation in which the gas supplied from the gas supply source is expelled after being heated by the heating section, and a non-heating operation in which the gas supplied from the gas supply source is expelled without being heated by the heating section.

3. The ionization device according to claim 1, wherein:
   the ionization probe includes a nebulizer-gas supply mechanism configured to supply a nebulizer gas for spraying the liquid sample; and
   the controller is configured to control the operation of the heated-gas supply mechanism synchronously with an operation of the nebulizer-gas supply mechanism.

4. The ionization device according to claim 1, wherein the controller is further configured to control the operation of the heated-gas supply mechanism so that the gas is expelled from the heated-gas supply mechanism at a predetermined flow rate for measurement time during a measurement period in which a measurement of the liquid sample is performed, while the gas is expelled from the heated-gas supply mechanism at a flow rate for standby time during a standby period in which no measurement of the liquid sample is performed, where the flow rate for standby time is lower than the flow rate for measurement time.

5. The ionization device according to claim 1, further comprising a drying-gas supply mechanism configured to expel a gas in an opposite direction to an ion current flowing into the ion introduction port.

6. The ionization device according to claim 5, wherein the controller is further configured to control the operation of the heated-gas supply mechanism so that the gas is expelled from the heated-gas supply mechanism at a predetermined first flow rate when there is the gas being expelled from the drying-gas supply mechanism, while the gas is expelled from the heated-gas supply mechanism at a second flow rate which is lower than the first flow rate, when there is no gas being expelled from the drying-gas supply mechanism.

7. A method for ionizing a liquid sample within an ionization chamber separated from an analysis chamber by a partition wall in which an ion introduction port is provided, the method comprising steps of:

introducing the liquid sample into an ionization probe to spray the liquid sample into the ionization chamber; and continuously expelling a gas from a heated-gas supply mechanism in a direction intersecting with a direction in which the liquid sample is sprayed from the ionization probe, regardless of presence or absence of an operation by a user, where the heated-gas supply mechanism, which is provided apart from the ionization probe, includes a gas supply source and a heating section for heating the gas supplied from the gas supply source;

wherein a gas-expelling operation by the heated-gas supply mechanism is automatically initiated simultaneously with or earlier than a point in time where spraying of the liquid sample is initiated, and the gas-expelling operation by the heated-gas supply mechanism is continued to a point in time simultaneous with or later than a completion of the spraying of the liquid sample.

\* \* \* \* \*